United States Patent
Murty et al.

(10) Patent No.: US 6,909,201 B2
(45) Date of Patent: Jun. 21, 2005

(54) DUAL VOLTAGE ARCHITECTURE FOR AUTOMOTIVE ELECTRICAL SYSTEMS

(75) Inventors: Balarama Vempaty Murty, West Bloomfield, MI (US); Chandra Sekhar Namuduri, Troy, MI (US)

(73) Assignee: General Motors Corporation, Detroit, MI (US)

( * ) Notice: Subject to any disclaimer, the term of this patent is extended or adjusted under 35 U.S.C. 154(b) by 45 days.

(21) Appl. No.: 10/336,960

(22) Filed: Jan. 6, 2003

(65) Prior Publication Data

US 2004/0130214 A1 Jul. 8, 2004

(51) Int. Cl.[7] ................................................. B60L 1/00
(52) U.S. Cl. ..................... 307/10.1; 307/10.6; 307/10.8
(58) Field of Search ............................. 307/10.1, 10.8; 320/103, 104, 116, 118

(56) References Cited

U.S. PATENT DOCUMENTS

| | | | |
|---|---|---|---|
| 3,793,544 A | * | 2/1974 | Baumgartner et al. ...... 320/123 |
| 3,975,670 A | * | 8/1976 | McDermott ................. 320/121 |
| 4,045,718 A | * | 8/1977 | Gray .......................... 320/123 |
| 4,094,007 A | * | 6/1978 | Minami ....................... 365/45 |
| 4,100,474 A | * | 7/1978 | Pfeffer et al. ............... 320/123 |
| 4,160,288 A | * | 7/1979 | Stuart et al. .................. 363/41 |

(Continued)

OTHER PUBLICATIONS

Ron Mancini, "Understanding Basic Analog–Active Devices", Apr. 2000, Texas Instruments, Application Report SLOA026A.*
"DC–DC Converter Module Level EMI", Motorola AIEG, pp 1–17.
"42–Volt Electrical System Is Needed to Meet Future Vehicle Needs", Autoparts Report, pp 1–4.
"A Bsrief History of 42V"pp1–4.
"42–Volt System", DELPHI, pp 1–3.
"VoltMaster Battery Equalizer", Vanner Power Group, Owner's Manual, pp. 1–16.

*Primary Examiner*—Robert L. Deberadinis
(74) *Attorney, Agent, or Firm*—Kathryn A. Marra

(57) ABSTRACT

A dual voltage automotive electrical system includes a generator for generating a first nominal voltage on a first voltage bus and a bi-directional DC/DC converter for converting the first nominal voltage to a second nominal voltage on a second voltage bus, the second nominal voltage being lower than said first nominal voltage. A battery is coupled to the first voltage bus and selectably coupled to the second voltage bus, and is capable of supplying power to loads on both the first voltage bus and the second voltage bus.

16 Claims, 2 Drawing Sheets

U.S. PATENT DOCUMENTS

| | | | | | |
|---|---|---|---|---|---|
| 4,203,151 | A | * | 5/1980 | Baker | 363/43 |
| 4,210,856 | A | * | 7/1980 | Taylor | 320/123 |
| 4,516,066 | A | * | 5/1985 | Nowakowski | 320/123 |
| 4,672,294 | A | * | 6/1987 | Norton | 320/123 |
| 4,698,578 | A | * | 10/1987 | Mullersman et al. | 320/121 |
| 4,723,079 | A | * | 2/1988 | Norton | 307/66 |
| 4,743,830 | A | * | 5/1988 | Lakey | 320/104 |
| 5,097,184 | A | * | 3/1992 | Echtler et al. | 318/139 |
| 5,528,122 | A | * | 6/1996 | Sullivan et al. | 320/118 |
| 5,583,751 | A | * | 12/1996 | Nakazawa et al. | 363/20 |
| 5,793,189 | A | * | 8/1998 | Kawaguchi et al. | 322/28 |
| 5,814,970 | A | * | 9/1998 | Schmidt | 320/118 |
| 5,900,716 | A | * | 5/1999 | Collar et al. | 320/118 |
| 5,977,753 | A | * | 11/1999 | Edwards et al. | 323/222 |
| 6,049,190 | A | * | 4/2000 | Canter et al. | 320/101 |
| 6,151,222 | A | | 11/2000 | Barrett | |
| 6,181,101 | B1 | * | 1/2001 | Arai et al. | 320/104 |
| 6,271,645 | B1 | * | 8/2001 | Schneider et al. | 320/118 |
| 6,275,004 | B1 | * | 8/2001 | Tamai et al. | 320/118 |
| 6,313,546 | B1 | * | 11/2001 | Nishimura et al. | 307/9.1 |
| 6,323,608 | B1 | | 11/2001 | Ozawa | |
| 6,335,577 | B1 | * | 1/2002 | Baba | 307/28 |
| 6,426,608 | B2 | * | 7/2002 | Amano et al. | 320/163 |
| 6,455,951 | B1 | * | 9/2002 | Shultz et al. | 307/10.1 |
| 6,489,753 | B1 | * | 12/2002 | Patterson | 320/162 |
| 6,496,109 | B1 | * | 12/2002 | Guzick, Jr. | 340/455 |
| 6,507,506 | B1 | * | 1/2003 | Pinas et al. | 363/79 |
| 6,549,064 | B2 | * | 4/2003 | Bandy et al. | 327/536 |
| 6,583,602 | B2 | * | 6/2003 | Imai et al. | 320/118 |
| 6,608,396 | B2 | * | 8/2003 | Downer et al. | 290/40 C |
| 6,690,585 | B2 | * | 2/2004 | Betts-LaCroix | 363/16 |

* cited by examiner

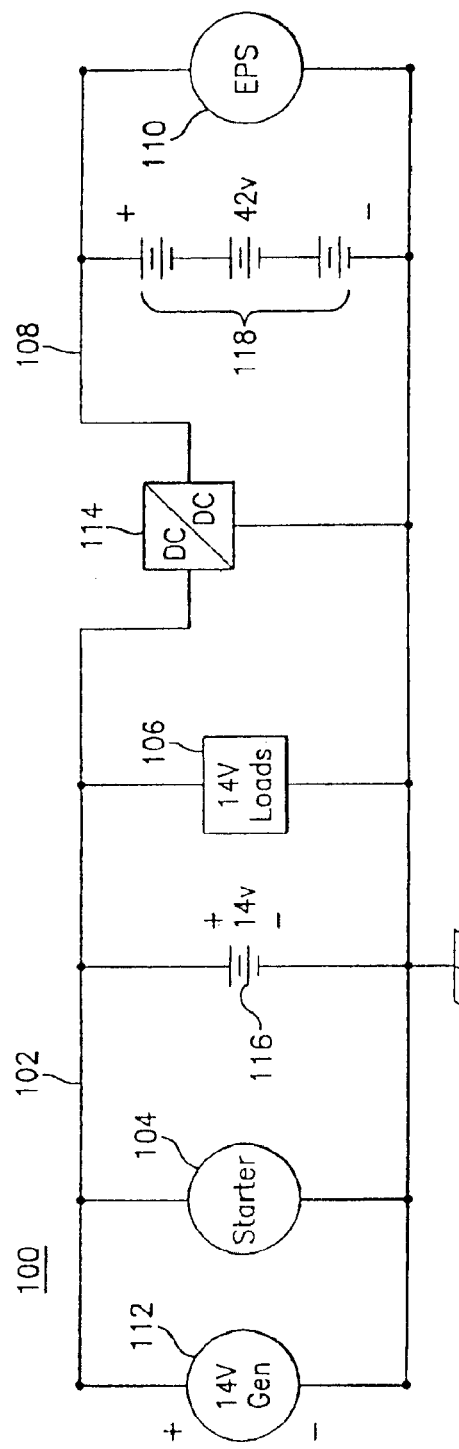
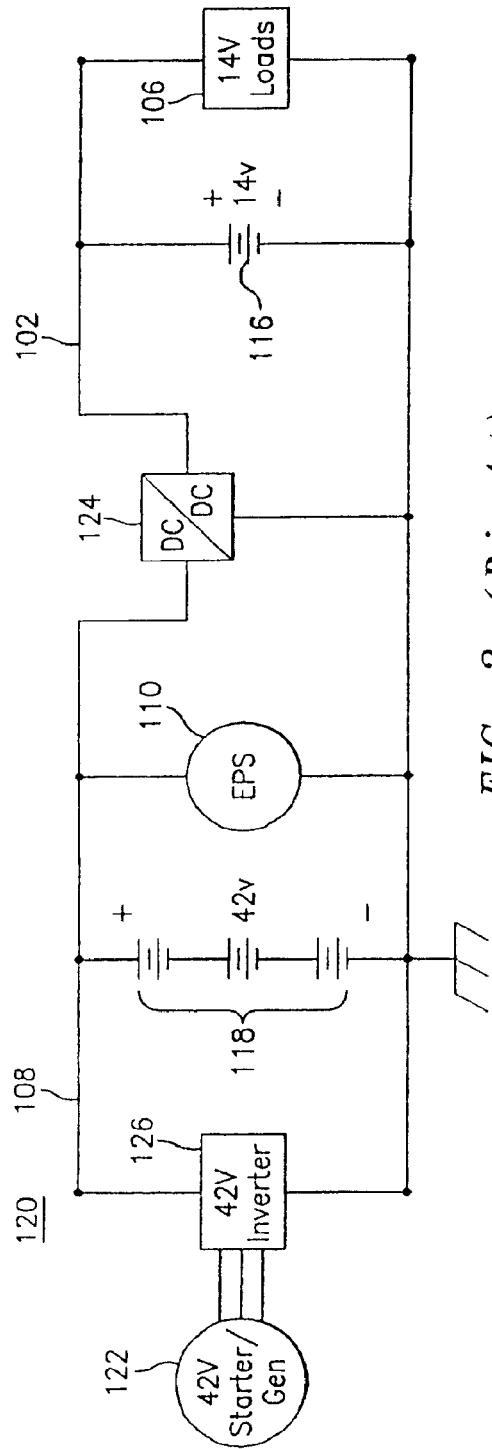
FIG. 1 (Prior Art)
FIG. 2 (Prior Art)

DUAL VOLTAGE ARCHITECTURE FOR AUTOMOTIVE ELECTRICAL SYSTEMS

BACKGROUND

The present disclosure relates generally to automotive electrical systems and, more particularly, to a dual voltage architecture for automotive electrical systems.

The increasing power demands on motor vehicle electrical systems as a result of added loads such as electric power steering and other customer convenience features has made it difficult to efficiently generate and distribute power with a traditional 12-volt battery/14-volt generator system. For example, in a luxury vehicle having electric power steering and instant PTC (positive temperature coefficient) heaters, the demand for power generation can be as much as 3.5 kW during normal operation and about 2.5 kW at enhanced idle speed. Thus, in order to continue to meet this increased power demand while maintaining/improving system operating efficiency, the automotive industry has begun to focus on implementing 42-volt systems.

However, one difficulty in converting the electrical system of vehicle to a higher voltage such as 42 volts stems from the fact that all of the vehicle's associated electrical loads, components, connectors, relays, etc. would necessarily have to be redesigned in order to accommodate the higher operating voltage. As such, a more likely scenario calls for a "transition period" in which vehicles will include both 14-volt and 42-volt components supplied by a corresponding hybrid (i.e., dual voltage) electrical system. In fact, there are several proposed dual voltage systems in existence that provide both a 14-volt operating voltage and a 42-volt operating voltage for a motor vehicle.

Unfortunately, many of these existing dual voltage systems have been designed without particular regard to packaging, space, cost and/or redundancy concerns. For example, certain dual voltage systems provide for two separate batteries (one for each operating voltage), while others employ expensive inverter circuitry associated with a higher voltage generator.

SUMMARY

In an exemplary embodiment, a dual voltage automotive electrical system includes a generator for generating a first nominal voltage on a first voltage bus and a bi-directional DC/DC converter for converting the first nominal voltage to a second nominal voltage on a second voltage bus, the second nominal voltage being lower than said first nominal voltage. A battery is coupled to the first voltage bus and selectably coupled to the second voltage bus, and is capable of supplying power to loads on both the first voltage bus and the second voltage bus.

In another embodiment, a dual voltage automotive electrical system includes a generator for generating a first nominal voltage on a first voltage bus and a bi-directional DC/DC converter for converting the first nominal voltage to a second nominal voltage on a second voltage bus, the second nominal voltage being lower than said first nominal voltage. In addition, a battery has a ground terminal, a high voltage terminal coupled to the first voltage bus, and a low voltage tap selectably coupled to the second voltage bus. A switching mechanism, is coupled between the low voltage tap of the battery and the second voltage bus, the switching mechanism causing the battery to supply power to loads on the second voltage bus whenever the actual voltage on the second voltage bus drops below the voltage on the low voltage tap.

BRIEF DESCRIPTION OF THE DRAWINGS

Referring to the exemplary drawings wherein like elements are numbered alike in the several Figures:

FIG. 1 is a schematic diagram of an existing dual voltage architecture for an automotive electrical system;

FIG. 2 is a schematic diagram of another existing dual voltage architecture for an automotive electrical system;

DETAILED DESCRIPTION

Figure 3:
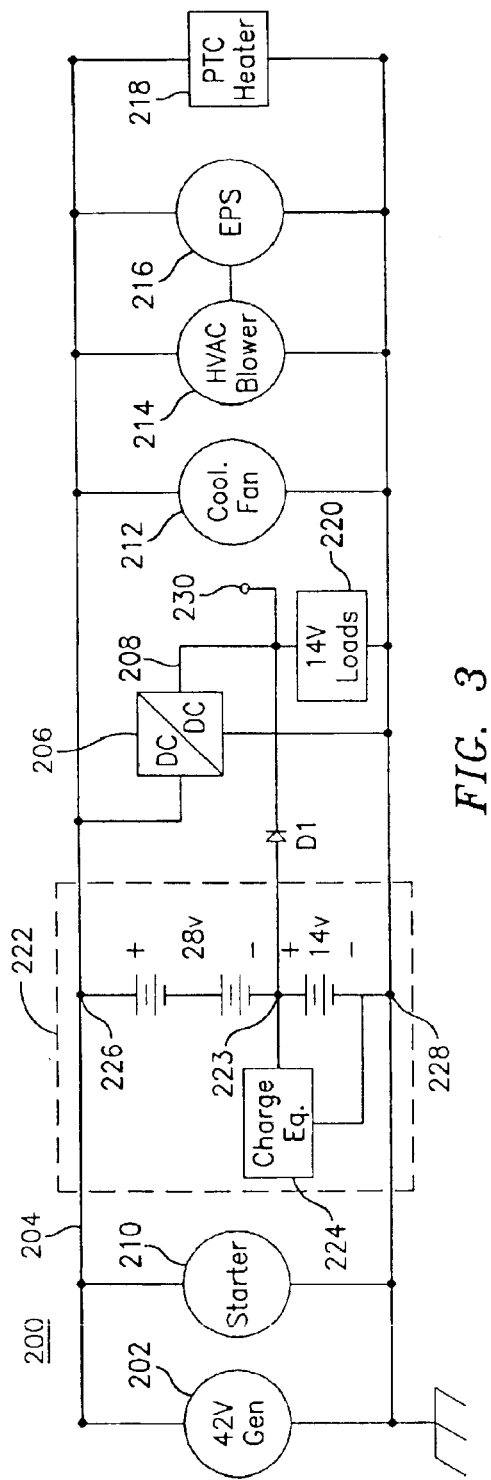
FIG. 3 is a schematic diagram of a dual voltage architecture for an automotive electrical system, in accordance with an embodiment of the invention.

Referring initially to FIG. 1, there is shown a schematic diagram of an existing dual voltage architecture 100 for an automotive electrical system. The architecture 100 includes both a 14-volt bus 102 (for powering starter motor 104 and various 14-volt loads 106) and a 42-volt bus 108 (for powering 42-volt loads such as an electric power steering unit 110). Power for the 14-volt bus 102 is supplied by a 14-volt generator 112, while the power for the 42-volt bus 108 is supplied by a DC/DC converter 114 configured in a "boost" mode (i.e., the output DC voltage is higher than the input DC voltage). As can be seen, the architecture 100 also features both a 14-volt battery 116 coupled to the 14-volt bus 102 and a separate 42-volt battery 118 coupled to the 42-volt bus 108.

As mentioned earlier, the incorporation of additional electrical loads in architecture 100 results in inefficient power generation and distribution using the 14-volt generator 112. In addition, the architecture 100 is not scalable to support higher power loads at 42 volts. Furthermore, the use of a separate 42-volt battery adds additional mass and cost to the system, and is sized in accordance with the peak power drawn by the 42-volt loads since the boost DC/DC converter 114 only supplies average power to the 42-volt loads. Thus, in the event of a failure of the 42-volt battery 118, the 42-volt loads effectively become disabled since they cannot start without the peak current capability provided by the 42-volt battery.

An alternative existing dual voltage architecture 120 is depicted in FIG. 2, in which power to the 42-volt bus 108 is supplied by a 42-volt starter/generator 122. A DC/DC converter 124 configured in a "buck" mode (i.e., the output DC voltage is lower than the input DC voltage) is used to supply power to the 14-volt bus 102 and thus to the 14-volt loads 106. As is the case with the architecture 100 of FIG. 1, architecture 120 also uses separate batteries for each voltage bus.

Although the use of the 42-volt starter/generator 122 provides improved power generation efficiency as compared with a 14-volt generator, there is also an increased cost associated therewith due to the presence of a 42-volt inverter 126 that includes relatively expensive power electronic circuitry for AC to DC conversion. In addition, the DC/DC converter 124 will be sized for a relatively high-power application, assuming the majority of the vehicle electrical loads still operate at 14 volts.

Therefore, in accordance with an embodiment of the invention, there is disclosed a dual voltage architecture for an automotive electrical system, in which a single battery configuration is employed to reduce packaging space, cost and complexity. A schematic diagram of the dual voltage architecture 200 is shown in FIG. 3. The architecture 200 includes a 42-volt generator 202 for supplying power to a 42-volt bus 204. A bi-directional DC/DC converter 206, in one operating mode, converts a 42-volt input voltage to a 14-volt output voltage for supply power to a 14-volt bus 208. The bi-directional DC/DC converter acts as a buck converter when supplying power to the 14-volt bus 208, but may also act as a boost converter in another operating mode by supplying power to the 42-volt bus 204.

To further improve efficiency, the architecture 200 supplies many of the traditional "high power" loads directly from the 42-volt bus 204, including starter motor 210, cooling fan 212, HVAC blower 214, electric power steering 216 and PTC heater 218. Other 14-volt electrical loads 220 may be supplied through the 14-volt bus 208.

As opposed to a pair of individual batteries, architecture 200 features a three terminal, 42-volt battery 222 that also includes a 14-volt tap 223 for connection to the 14-volt bus 208 through diode D1. Thus a single battery is used to provide the cranking power for the 42-volt starter motor 210, as well as to provide peak load power for the 14-volt loads 220. The diode D1 serves as a switching mechanism for coupling the 14-volt loads 220 to the 14-volt tap 223 of the battery 222 whenever the voltage on the 14-volt bus 208 drops below the tap voltage, as would be the case during peak loading. Under heavy current demand on the 14-volt bus, the output of the DC/DC converter 206 drops below the tap voltage, thereby causing D1 to become forward biased such that the battery 222 directly supplies current to the 14-volt loads 220.

The battery 222 is also provided with a charge equalizing device 224 to correct for any charge imbalance between the lower 14-volt section of the battery and the upper 28-volt portion. The charge equalizing device 224 includes three terminals, one connected to the high voltage terminal 226 of the battery 222 (i.e., the 42-volt terminal), another connected to the low voltage tap 223 (i.e., the 14-volt tap), and a third connected to the ground terminal 228 of the battery 222. Thus configured, the charge equalizing device 224 prevents the upper portion of the battery 222 from overcharging while the lower portion is discharged by 14-volt parasitic loads. The charge equalizing device 224 is preferably integrated within the battery 222, and may be selected from any suitable commercially available battery charge equalizers known in the art, such as those manufactured by the Vanner Corporation.

Finally, the battery 222 is provided with a jumper post 230 at the 14-volt tap 223 so as to allow for a jump-start from a conventional vehicle battery. Although in a normal operating mode the DC/DC converter 206 is in a buck mode, it also operates in a boost mode when receiving jump aid from a 14-volt battery, thereby providing sufficient cranking power to the 42-volt starter motor 210.

Figure 4:
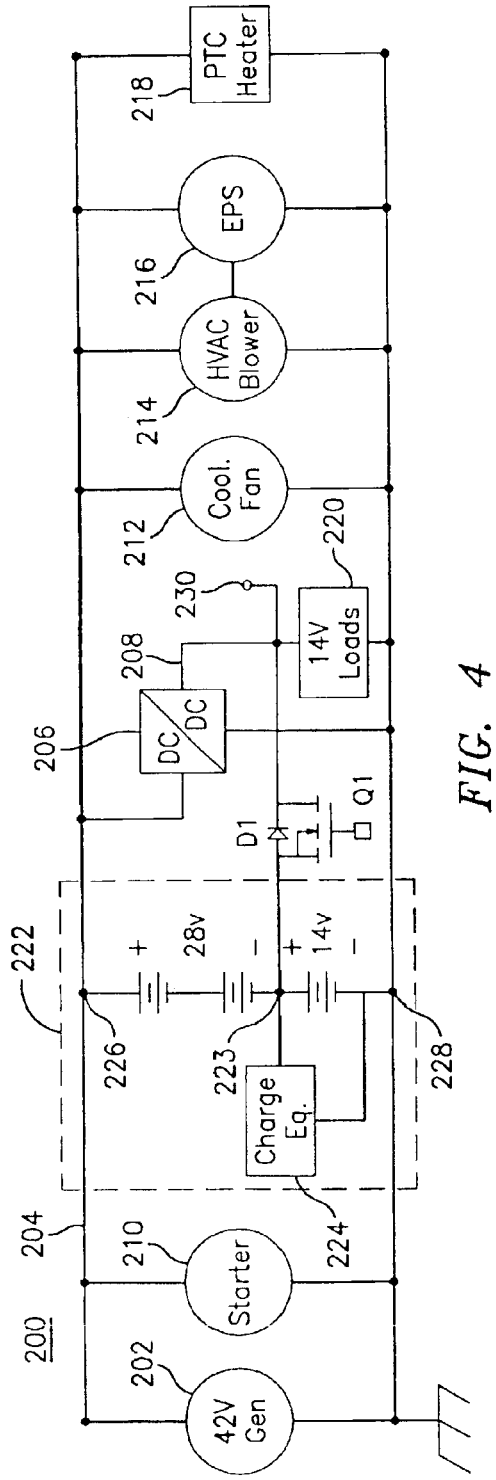
FIG. 4 is an alternative embodiment of the dual voltage architecture of FIG. 3.

FIG. 4 is an alternative embodiment of the architecture 200 of FIG. 3, wherein the diode D1 is actually the body-drain diode of a MOSFET Q1. This embodiment of a switching mechanism may be used to further improve efficiency since the voltage drop across Q1 is much lower than that of the body-drain diode. In addition, Q1 may be utilized as a synchronous rectifier by rendering it conductive whenever peak loads are detected by the forward bias of D1. Moreover, if the current capability of the charge equalizing device 224 were insufficient to maintain a balance charge within the battery 222, then Q1 may be used in conjunction with the DC/DC converter 206 to more rapidly charge the 14-volt section of the battery 222.

It will thus be appreciated that above described dual voltage architecture 200 provides a simple, yet economical system featuring a single belt-driven generator and battery. At 42 volts, the battery 222 is sized for handling both the cranking and parasitic load requirements, as is the case with a conventional, 14-volt single battery power system. Since the cranking is done at 42 volts, there is less voltage drop in the power cables, thus allowing for more voltage/power available to the starter motor 210. The power conversion and utilization efficiency of the system are further improved by adapting certain heavier loads, such as the engine cooling fan and the HVAC blower fan motor, for operation at 42 volts. The architecture 200 also provides a measure of redundancy in that if the 14-volt section of the battery fails or becomes discharged, the 14-volt loads may still be supplied by the 42-volt generator 202 through the DC/DC converter 206. On the other hand, if the DC/DC converter 206 fails, the 14-volt battery section will still provide power to the 14-volt loads for "limp home" capability.

While the invention has been described with reference to a preferred embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A dual voltage automotive electrical system, comprising:
    a generator for generating a first nominal voltage on a first voltage bus;
    a bi-directional DC/DC converter for converting said first nominal voltage to a second nominal voltage on a second voltage bus, said second nominal voltage being lower than said first nominal voltage;
    a battery, coupled to said first voltage bus and selectably coupled to said second voltage bus, said battery capable of supplying power to loads on both said first voltage bus and said second voltage bus; and
    a switching mechanism coupled between said battery and said second voltage bus, wherein said switching mechanism causes said battery to supply power to loads on said second voltage bus in response to the actual voltage on said second voltage bus from said bi-directional converter dropping below the voltage available to said second voltage bus from said battery.

2. The system of claim 1, wherein said battery further includes a ground terminal, a high voltage terminal connected to said first voltage bus, and a low voltage tap connected to said second voltage bus.

3. The system of claim 2, wherein said switching mechanism causes said battery to supply power to loads on said second voltage bus whenever the actual voltage on said second voltage bus drops below the voltage on said low voltage tap.

4. The system of claim 3, wherein said switching mechanism further comprises a diode coupled between said battery and said second voltage bus, said diode becoming forward biased whenever the actual voltage on said second voltage bus drops below the voltage on said low voltage tap.

5. The system of claim 3, wherein said switching mechanism further comprises a MOSFET coupled between said battery and said second voltage bus, said MOSFET having a body-drain diode that becomes forward biased whenever the actual voltage on said second voltage bus drops below the voltage on said low voltage tap.

6. The system of claim 2, further comprising a charge equalizing device coupled to said battery, and coupled to said bi-directional converter via said switching mechanism.

7. The system of claim 2, wherein said battery further includes a jumper post coupled to said low voltage tap, said battery thereby capable of receiving a jump start from another battery having a voltage corresponding to said second nominal voltage.

8. The system of claim 2, wherein said first voltage bus is used to supply power to at least one of: a starter motor, a cooling fan motor, an electric power steering motor, an HVAC (heating, ventilation and air conditioning) motor, and a PTC (positive temperature coefficient) heater.

9. A dual voltage automotive electrical system, comprising:
   a generator for generating a first nominal voltage on a first voltage bus;
   a bi-directional DC/DC converter for converting said first nominal voltage to a second nominal voltage on a second voltage bus, said second nominal voltage being lower than said first nominal voltage;
   a battery, said battery having aground terminal, a high voltage terminal coupled to said first voltage bus, and a low voltage tap selectably coupled to said second voltage bus; and
   a switching mechanism, coupled between said low voltage tap of said battery and said second voltage bus, said switching mechanism causing said battery to supply power to loads on said second voltage bus in response to the actual voltage on said second voltage bus from said bi-directional converter dropping below the voltage on said low voltage tap from said battery.

10. The system of claim 9, further comprising a charge equalizing device coupled to said battery, and coupled to said bi-directional converter via said switching mechanism.

11. The system of claim 9, wherein said battery further includes a jumper post coupled to said low voltage tap, said battery thereby capable of receiving a jump start from another battery having a voltage corresponding to said second nominal voltage.

12. The system of claim 9, wherein said switching mechanism further comprise a diode coupled between said battery and said second voltage bus, said diode becoming forward biased whenever the actual voltage on said second voltage bus drops below the voltage on said low voltage tap.

13. The system of claim 9, wherein said switching mechanism further comprises a MOSFET coupled between said battery and said second voltage bus, said MOSFET having a body-drain diode that becomes forward biased whenever the actual voltage on said second voltage bus drops below the voltage on said low voltage tap.

14. The system of claim 9, wherein said first voltage bus is used to supply power to at least one of: a starter motor, a cooling fan motor, an electric power steering motor, an HVAC (heating, ventilation and air conditioning) motor, and a FTC (positive temperature coefficient) heater.

15. The system of claim 9, wherein said first nominal voltage is about 42 volts and said second nominal voltage is about 14 volts.

16. A dual voltage automotive electrical system, comprising:
   a generator for generating a first nominal voltage on a first voltage bus;
   a bi-directional DC/DC converter for converting said first nominal voltage to a second nominal voltage on a second voltage bus, said second nominal voltage being lower than said first nominal voltage;
   a battery, said battery having a ground terminal, a high voltage terminal coupled to said first voltage bus, and a low voltage tap selectably coupled to said second voltage bus;
   a switching mechanism, coupled between said low voltage tap of said battery and said second voltage bus, said switching mechanism causing said battery to supply power to loads on said second voltage bus in response to the actual voltage on said second voltage bus from said hi-directional converter dropping below the voltage on said low voltage tap from said battery; and
   a charge equalizing device, said charge equalizing device coupled to said battery, and said charge equalizing device coupled to said bi-directional converter via said switching mechanism such that said switching device causes said bi-directional converter to charge said battery in response to said charge equalizing device having insufficient capability to maintain a charge balance at said battery.

* * * * *